United States Patent
Deiderich, III (10) Patent No.: US 10,628,309 B1
(45) Date of Patent: Apr. 21, 2020

(54) LOADING A SERIAL PRESENCE DETECT TABLE ACCORDING TO JUMPER SETTINGS

(71) Applicant: American Megatrends International, LLC, Norcross, GA (US)

(72) Inventor: Michael Harry Deiderich, III, Duluth, GA (US)

(73) Assignee: American Megatrends International, LLC, Norcross, GA (US)

( * ) Notice: Subject to any disclaimer, the term of this patent is extended or adjusted under 35 U.S.C. 154(b) by 0 days.

(21) Appl. No.: 15/725,981

(22) Filed: Oct. 5, 2017

(51) Int. Cl.
    *G06F 12/06*     (2006.01)
    *G06F 3/06*     (2006.01)

(52) U.S. Cl.
    CPC ........ *G06F 12/0623* (2013.01); *G06F 3/0604* (2013.01); *G06F 3/0629* (2013.01); *G06F 3/0632* (2013.01); *G06F 3/0683* (2013.01)

(58) Field of Classification Search
    CPC .... G06F 3/0604; G06F 3/0632; G06F 3/0629; G06F 3/0683; G06F 12/0623
    See application file for complete search history.

(56) References Cited

U.S. PATENT DOCUMENTS

2005/0223206 A1 * 10/2005 Janzen .................. G06F 11/073
    713/1

FOREIGN PATENT DOCUMENTS

CN     102063275 A * 5/2011

* cited by examiner

*Primary Examiner* — David Yi
*Assistant Examiner* — Alan Otto
(74) *Attorney, Agent, or Firm* — Newport IP, LLC; Leonard J. Hope (57) ABSTRACT

Technologies are disclosed herein for configuring a system memory of a computer system by determining which, of a plurality, of serial presence detect (SPD) tables to utilize, based at least in part on settings of one or more GPIO pins. The computer system may be available with variations of the configuration of system memory. The SPD tables corresponding to each of the different configurations of the system memory may be stored on the computer system, such as on an NVRAM of the computer system. After identifying the appropriate SPD table, a processor may load the SPD table to a memory reference code of the computer system. In some cases, the state GPIO pins indicating the system memory configuration is set at the time of manufacture of the computer system.

14 Claims, 5 Drawing Sheets

LOADING A SERIAL PRESENCE DETECT TABLE ACCORDING TO JUMPER SETTINGS

BACKGROUND

Many computers systems utilize firmware, such as a universal extensible firmware interface (UEFI) or basic input/output system (BIOS), when booting up the computer system. The firmware may perform various services during boot-up, after which the system may operate in runtime under the control of an operating system (O/S). The firmware is often stored on a non-volatile memory, such as non-volatile random access memory (NVRAM), of the computer system.

One of the services during boot-up, as enabled by the firmware of a computer is system memory configuration by loading a serial presence detect (SPD) table that corresponds to the memory configuration of the computer system. In some cases, a computer system may be manufactured and available to consumers in similar versions that have different sizes and/or memory types. In these cases, each of the versions of the computer system may utilize a different SPD table for the purposes of configuring system memory.

It may be expensive and/or impractical to have a wide variety of SPD tables stored on a computer for the purposes of configuring system memory during boot-up. Additionally, there may be additional overhead to indicate to a processor which SPD table it is to load, even if there are a limited set of SPD tables corresponding to the variations in memory configurations available with a computer system.

It is with respect to these considerations and others that the disclosure made herein is provided.

SUMMARY

The technologies disclosed herein provide functionality for using one or more general purpose input/output (GPIO) pins as a memory configuration flag. GPIO pins may be configured such that a jumper connection across one or more of the GPIO pins may indicate a memory configuration of a computer system and, therefore, indicate to a processor of the computer system, which serial presence detect (SPD) table from a plurality of stored SPD tables are to be loaded to configure the system memory of the computer system.

According to example embodiments, if a computer system is to be manufactured with a number of versions that differ from each other by their memory configuration (e.g., memory size, configuration, etc.), then the SPD tables for each of the different memory configurations may be stored at a memory location, such as non-volatile random access memory (NVRAM). In some cases, the various SPD tables may be stored in the same NVRAM location as firmware that enables the bootup of the computer system. The memory location of each of the SPD tables may be known to components of the firmware, such as firmware components that enable processes for configuring the memory of the computer system.

During bootup, the processes enabled by the firmware may determine the memory configuration of the computer system based at least in part on jumper settings of one or more GPIO pin(s). These one or more GPIO pin(s) may be predesignated as indicators of the memory configuration. In some cases, these one or more pin(s) may be set, such as by providing or not providing jumpers thereacross, at a factory or place of manufacture, where the system memory may be provided on the computer system. After the bootup processes enabled by the firmware determine the memory configuration of the computer system, the system may access and load the SPD table corresponding to the determined memory configuration.

The above-described subject matter may be implemented as a computer-controlled apparatus, a computer-implemented process, a computing system, or as an article of manufacture such as a non-transitory computer-readable storage medium. These and various other features will be understood from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following detailed description is directed to loading a serial presence detect (SPD) table to configure system memory of a computer system during bootup of the computer system.

In some example embodiments, computer systems may be available in a variety of memory configurations, but otherwise in substantially similar configurations. In these cases, the computer system may load one out of a plurality of SPD tables corresponding to the memory configuration of the computer system. The SPD table corresponding to the particular memory configuration of a computer system may be determined from jumper settings of one or more GPIO pins.

In example embodiments, all of the different SPD tables corresponding to each of the possible memory configurations may be stored on the computer system, such as on a non-volatile random access memory (NVRAM) device. In this way, during computer system manufacture, the NVRAM (e.g., flash memory) may be generated (e.g., flashed) in the same manner for all the different system memory configurations. Not having to customize the NVRAM provided on the manufactured computer systems may allow for increased manufacturing efficiency and reduced cost, while still allowing for computer system memory customization.

With the mechanisms described herein, it will be appreciated that computer systems with customized memory configurations may be manufactured in a more efficient, cost-efficient, and/or error-free way. According to example embodiments, the various SPD tables may be stored on the NVRAM on which the firmware may be stored, rather than on an electrically erasable programable read only memory (EEPROM) of a memory module, such as a dual inline pin memory module (DIMM).

Generally, program modules, such as firmware components, include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable consumer electronics, minicomputers, mainframe computers, and the like.

The subject matter described herein can be practiced in a distributed computing environment where tasks are performed by remote processing devices that are linked through a communications network, and wherein program modules may be located in both local and remote memory storage devices. It should be appreciated, however, that the implementations described herein can also be utilized in conjunction with stand-alone computer systems and other types of computing devices. It should also be appreciated that the embodiments presented herein can be utilized with any type of local area network (LAN) or wide area network (WAN).

In the following detailed description, references are made to the accompanying drawings that form a part hereof, and which are shown by way of illustration specific embodiments or examples. Referring now to the drawings, in which like numerals represent like elements through the several FIGURES, aspects of a computing system and methodology for updating a firmware will be described.

Figure 1:
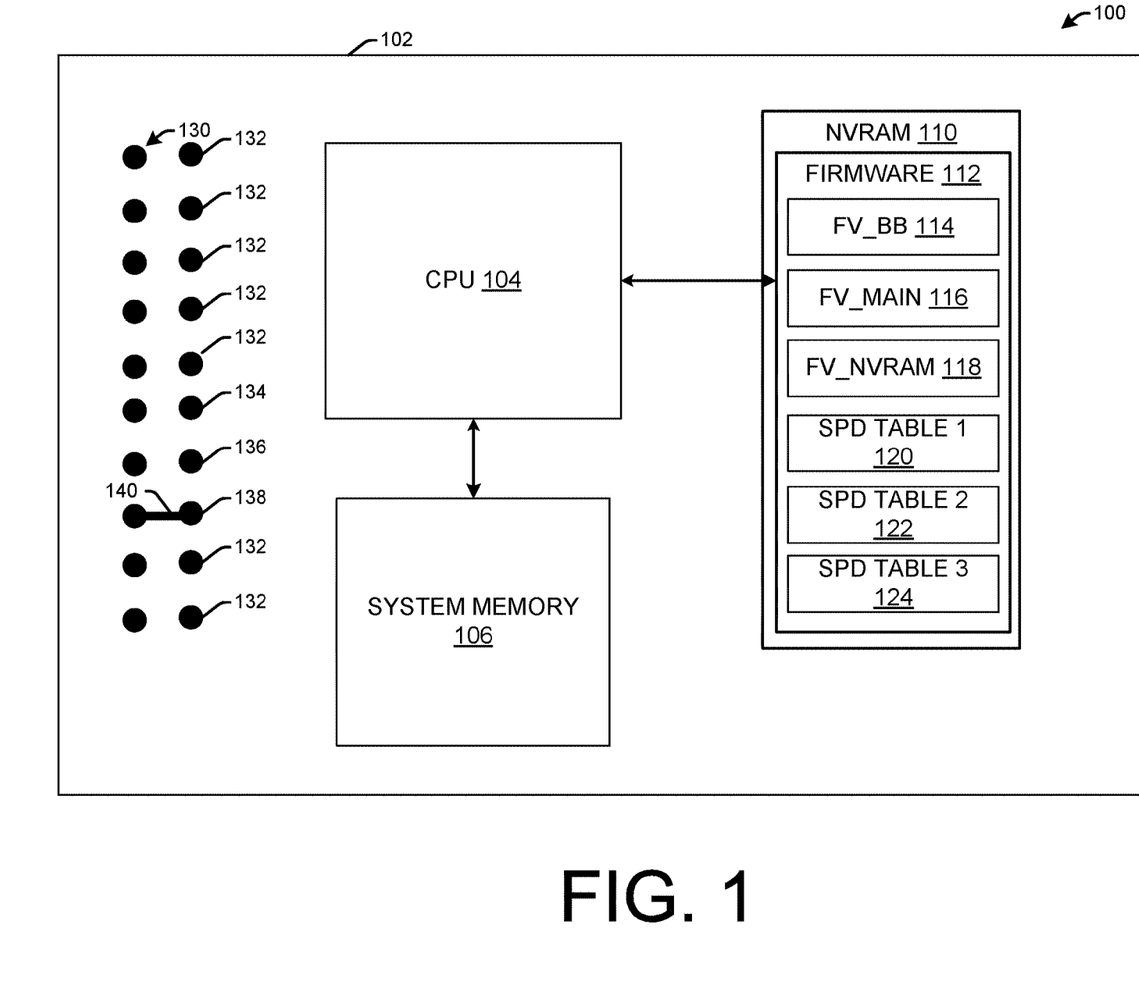
FIG. 1 is a block diagram showing example computer system with a firmware that provides boot-up services to load a serial presence detect (SPD) table based at least in part on one or more GPIO pin settings, according to example embodiments of the disclosure.

FIG. 1 is a block diagram showing example computer system 100 with a firmware 112 that provides boot-up services to load a serial presence detect (SPD) table based at least in part on one or more GPIO pin 130 settings, according to example embodiments of the disclosure.

The system 100 may include a motherboard 102 with one or more central processing unit(s) (CPU) 104. The system 100 may further include one or more non-volatile memory locations, such as non-volatile random access memory (NVRAM) 110, or any other suitable non-volatile memory or storage. The system 100 may further include system memory 106 on the motherboard 104, which may be communicatively coupled to the CPU 104.

The NVRAM 110 may have the firmware 112 stored thereupon. The firmware 112 may have various volumes, such as FV_BB 114, FV_MAIN 116, FV_NVRAM 118, or the like. Each of the firmware volumes 114, 116, and 118 may have firmware components stored therein, such as executable files, device drivers, configuration state variables, or the like. The firmware 112 as a collection of firmware components stored across various firmware volumes 114, 116, and 118 enable the boot-up of the system 100.

The firmware 112 may further include one or more SPD tables, such as SPD table 1 120, SPD table 2 122, and/or SPD table 3 124. Although three different SPD tables are depicted here, it should be understood that there may be any suitable number of SPD tables.

The firmware 112 may be of any suitable type including, but not limited to, basic input/output system (BIOS), extensible firmware interface (EFI), universal extensible firmware interface (UEFI), Open Firmware, combinations thereof, or the like. The firmware 112 and the functionality thereof may be incorporated as part of any suitable computing system 100 including, but not limited to, servers, desktop computers, laptop computers, netbook computers, set-top-boxes, gaming consoles, Wi-Fi routers, smartphones, wearable computers, smart appliances, home automation/control systems, vehicle infotainment systems, combinations thereof, or the like.

The firmware 112 and/or components thereof may enable boot-up services and/or runtime services for computing systems with any suitable type of one or more processors 104 including, but not limited to INTEL ARCHITECTURE (IA) processors from INTEL CORP., processors from ADVANCED MICRO DEVICES (AMD), POWERPC/ POWER ARCHITECTURE processors and/or Microcontrollers, ARM PROCESSORS, processors and/or microcontrollers from FUJITSU, ST MICROELECTRONICS, FREESCALE SEMICONDUCTOR, INTERNATIONAL BUSINESS MACHINES ("IBM"), TEXAS INSTRUMENTS, QUALCOMM, BROADCOM, SAMSUNG, ORACLE CORP./SUN MICROSYSTEMS, any variety of single-core processors, any variety of multi-core processors, central processing units (CPUs), microcontrollers, embedded processors, combinations thereof, or the like. As a nonlimiting example, the firmware may be manufactured by PHOENIX TECHNOLOGIES, AMERICAN MEGATRENDS INC., or any other suitable manufacturer of firmware.

The system 100 may further include a serial peripheral interface (SPI) controller 120. In example embodiments, the SPI controller 120 may control the flow of data, such as on one or more busses of the system 100. The SPI controller 120 may operate under the control of the CPU 102 in example embodiments. The SPI controller 120 may be enabled to access the firmware 112 stored on the NVRAM 110 with which the CPU 102 performs boot-up services prior to runtime of the system 100.

In example embodiments, the system memory 106 may be a dynamic random access memory (DRAM). The CPU 104 may further be communicatively coupled to system memory 106 and may be configured to execute instructions stored thereon and/or read or store data thereon. The system memory 106 may be of any suitable size (e.g., 4 GB, 8 GB, etc.). In some example embodiments, the computer system 100 may be manufactured substantially similarly to each other, except for variations in the system memory 106. These variations may be the type of memory (e.g., DRAM, SDRAM, SRAM, etc.), memory channels (e.g., DDR3, DDR4, mDDR, etc.), size (e.g., 2 GB, 4, GB, etc.), latency (e.g., 5 ns, 10 ns, etc.), or the like.

In some cases, by executing the firmware components of FV_BB 114, the CPU 104 may perform a security (SEC) phase and/or pre-extensible firmware interface initialization (PEI) phase of boot-up operations. The CPU 104 may further access and execute the firmware components of FV_MAIN 116. In some cases, by executing the firmware components of FV_MAIN 116, the CPU 104 may perform a driver execution environment (DXE) phase and/or a boot device select (BDS) phase of the boot-up operations. The CPU 104 may execute instructions and various phases of the boot-up process as described above and as enabled by various components or services of the firmware 112 to place the system 100 in runtime under the control of an operating system (O/S) or other higher-level applications.

The system 100 may include one or more port(s), such as a set of one or more general-purpose input/output (GPIO) pin(s) 130, such as a GPIO port. The set of GPIO pins 130 may include one or more GPIO pins 132, as well as GPIO pins 134, GPIO pins 136, and GPIO pins 138. GPIO pins 132 may be used for various input and/or output functions of the system 100. For example, settings for any number of peripheral devices of the system 100 may be indicated by the GPIO pins 132.

The GPIO pins 130 may be enabled, or disabled, by placing a jumper 140 thereacross. For example, as shown, the jumper 140 is placed on the GPIO pins 138, thereby enabling those GPIO pins 138, or the functions enabled therewith. It should be appreciated that there may be any number of GPIO pins 130 that may be enabled or disabled by providing a jumper 140 thereacross. It will also be appreciated that some functions may be enabled by providing a jumper 140 across the corresponding GPIO pins 130, and other functions may be enabled by a lack of the jumper 140 across the corresponding GPIO pins 130.

According to example embodiments, GPIO pins 134, GPIO pins 136, and GPIO pins 138 may be used to indicate the system memory 106 configuration of the system 100. Although three GPIO pins 134, 136, 138 are shown, as an example, to indicate the system memory 106 configuration, it should be appreciated that there may be fewer or greater numbers of GPIO pins 130 allocated for the purpose of indicating the system memory 106 configuration.

In example embodiments, the memory configuration GPIO pins 134, 136, 138 may be used to indicate any variety of system memory 106 types and/or configuration. These system memory 106 types and/or configuration may be used to select the corresponding SPD table 120, 122, 124 of the system memory 106. One or more of the memory configuration GPIO pins 134, 136, 138 may be allocated for particular features of the system memory 106. For example, one or more GPIO pins 134, 136, 138 may be used to indicate the size of the system memory. Similarly, one or more GPIO pins 134, 136, 138 may be used to indicate the bus type, memory type, latency, or any number of other factors that indicate which of the SPD tables 120, 122, 124 correspond to the system memory 106.

According to example embodiments, the GPIO pins 134, 136, 138 may indicate various features of the system memory 106 that are indicative of an SPD table 120, 122, 124 that the CPU 104 is to load. It will be appreciated that the features indicated by the enabling and/or disabling of the GPIO pins 134, 136, 138 may be a subset of all of the features of the system memory 106. The features specified by the setting of the GPIO pins 134, 136, 138 may indicate a feature that indicates a differentiation between various potential system memory configurations 106 of the system 100.

As a non-limiting example, if the system memory 106 may vary according to one of three different memory sizes, then the GPIO pins 134, 136, 138 may indicate the memory size of the system memory. For example, enabling GPIO pin 134 may indicate a 2 GB memory size, enabling GPIO pin 136 may indicate a 4 GB memory size, and enabling GPIO pin 138 may indicate a 8 GB memory size. Each of these three system memories 106, as identified by the feature of its memory size, may have a corresponding SPD table 120, 122, 124. Thus, the CPU 104 may be configured to determine which of the GPIO pins 134, 136, 138 is enabled, and then use the corresponding SPD table 120, 122, 124, as stored on the NVRAM 110, to initialize the system memory 106 during bootup.

As another non-limiting example, the memory configuration GPIO pins 134, 136, 138 may indicate a type of memory channel. For example, enabling GPIO pins 134 may indicate a double data rate (DDR) 2 channel, enabling GPIO pins 136 may indicate DDR3 channel, and enabling GPIO pins 138 may indicate DDR4 channel. Each of these three system memories 106, as identified by the channel type, may have a corresponding SPD table 120, 122, 124. Thus, the CPU 104 may be configured to determine which of the GPIO pins 134, 136, 138 is enabled, and then use the corresponding SPD table 120, 122, 124, as stored on the NVRAM 110, to initialize the system memory 106 during bootup.

As yet another non-limiting example, the memory configuration GPIO pins 134, 136, 138 may indicate both a memory size and a type of memory channel. For example, GPIO pins 134 may indicate a DDR3 channel when enabled or a DDR4 channel when not enabled, and enabling GPIO pins 136 may indicate a 4 GB memory size, and enabling GPIO pins 138 may indicate a 8 GB memory size. Each of these four system memory configurations 106, as identified by the channel type and memory size, may have a corresponding SPD table, such as four different SPD tables stored on the NVRAM 110. Thus, the CPU 104 may be configured to determine which of the GPIO pins 134, 136, 138 is enabled, and then use the corresponding SPD table, as stored on the NVRAM 110, to initialize the system memory 106 during bootup.

The SPD tables, such as those stored on the NVRAM 110, may be any suitable size, such as 128 bytes. These SPD tables may indicate a variety of configuration information associated with the system memory 106 of the system 100. The CPU 104 may be configured to load the information stored on the SPD table into a memory reference code structure of the system 100 to initialize the system memory 106 for use.

In some example embodiments, the SPD tables may stored on the NVRAM 110 and the memory configuration GPIO pins 134, 136, 138 may be set during the time of manufacture of the computer system 100. Thus the manufacturer of the computer system 100 may make variations of the computer system 100 with various system memory 106 configurations, and reliably be able to load the appropriate SPD tables corresponding to the particular system memory 106 of the system 100.

Figure 2:
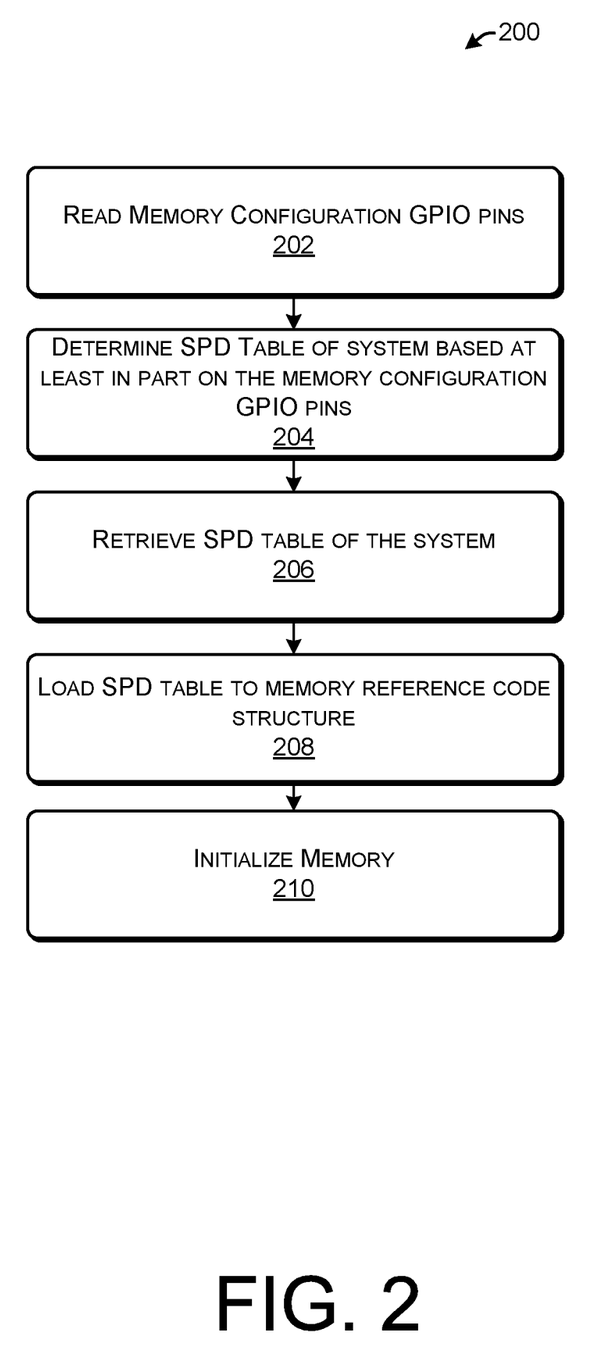
FIG. 2 is a flow diagram illustrating an example method for retrieving an SPD table and initializing memory, according to example embodiments of the disclosure.

FIG. 2 is a flow diagram illustrating an example method 200 for retrieving an SPD table and initializing memory 106, according to example embodiments of the disclosure. The method 200 may be performed by the CPU 104, such as under the control of firmware 112, and/or any other suitable component of the system 100.

At block 202, the memory configurations GPIO pins 134, 136, 138 may be read. These GPIO pins 134, 136, 138 may be read during one or more phases of the boot-up, such as during the DXE phase. The CPU 104 may be configured to read the GPIO pins 134, 136, 138 via one or more busses and/or connections on the motherboard 102 of the system 100. It will be appreciated that reading the memory configuration GPIO pins 134, 136, 138 may indicate to the CPU 104 which of the GPIO pins are enabled and/or disabled. In some cases, providing a jumper 140 across the GPIO pins 130 enable GPIO pins 130, and in other cases, the lack of a jumper 140 may enable GPIO pins 130. In either case, the state (e.g., jumper provided or not provided) of the GPIO pins 134, 136, 138 may indicate a configuration and/or feature of the system memory 106.

At block 204, the SPD table corresponding to the system memory 106 may be determined based at least in part on the state of the memory configuration GPIO pins 134, 136, 138. The CPU 104 may be configured, such as by the firmware 112, to identify the SPD table 120, 122, 124, as stored on the NVRAM 110, corresponding to the state of the GPIO pins 134, 136, 138, as determined by the processes of block 202. The correspondence of the states of the memory configuration GPIO pins 134, 136, 138 to the SPD tables 120, 122, 124 may be stored on a table, such as a correspondence table stored on the NVRAM 110. In some example embodiments, such a correspondence table may be stored as part of the firmware 112 on the NVRAM 110.

At block 206, the SPD table for the system 100 may be retrieved. This may entail the CPU accessing the appropriate SPD table 120, 122, 124, as determined by the processes of block 204, from the NVRAM 110.

At block 208, the SPD table may be loaded to the memory reference code structure. This may provide for the system 100 and the processor 104 thereon to define the system memory 106 of the system 100. In some cases, the SPD tables 120, 122, 124 may be 128 bytes in size, and the corresponding SPD table 120, 122, 124 may be retrieved from the NVRAM 110 by the processes of block 206, and concurrently loaded to the memory reference code structure. At block 210, the memory may be initialized according to the SPD table, as loaded to the memory reference code structure.

It should be appreciated that the loading of the SPD table and initialization of the system memory 106 may be performed during bootup of the computer system 100. After the system 100 and the CPU 104 completes the boot-up activities, the system may be under the control of an operating system (O/S), such as LINUX, MICROSOFT WINDOWS, APPLE OSX, GOOGLE ANDROID, or the like, that uses the system memory 106 as initialized by method 200.

Figure 3:
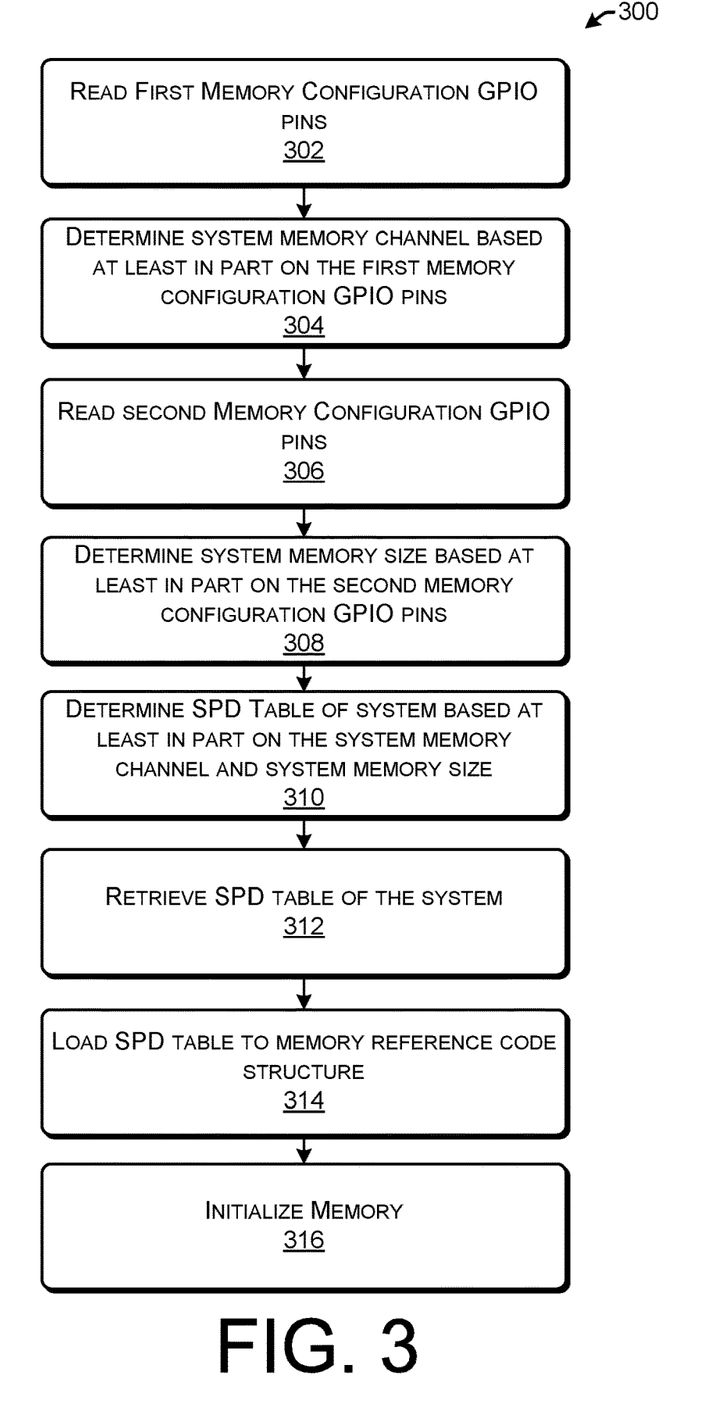
FIG. 3 is flow diagram illustrating an example method for detecting GPIO pins to determine a system memory channel and system memory size to initialize memory, according to example embodiments of the disclosure.

FIG. 3 is flow diagram illustrating an example method 300 for detecting GPIO pins 134, 136, 138 to determine a system memory 106 channel and system memory 106 size to initialize memory, according to example embodiments of the disclosure. The method 300 may be performed on one or more processors, such as the CPU 104, and/or any other suitable components of the system 100. In example embodiments, the method 300 may be a specific example of method 200, as described above with reference to FIG. 2. This method 300 is an example of two different features (e.g., system memory channels and memory size) that may provide for variations of the computer system 100, for which an appropriate SPD table is to be utilized. It will be appreciated that computer systems 100 may be customized with more, or fewer, or other memory features than those discussed herein, in accordance with example embodiments of the disclosure.

At block 302, a first memory configuration GPIO pins 134, 136, 138 may be read. It will be appreciated that reading the memory configuration GPIO pins 134, 136, 138 may indicate to the CPU 104 which of the GPIO pins are enabled and/or disabled. In some cases, providing a jumper 140 across the GPIO pins 130 enable GPIO pins 130, and in other cases, the lack of a jumper 140 may enable GPIO pins 130. In either case, the state (e.g., jumper provided or not provided) of the GPIO pins 134, 136, 138 may be indicative of a system memory channel (e.g., mDDR, DDR4, etc.). In some cases, one of the GPIO pins (e.g., GPIO pins 134) may be part of the first memory configuration GPIO pins, allocated to indicate the system memory channel. In other cases, there may be two or more (e.g., GPIO pins 134 and GPIO pins 136) that are part of the first memory configuration GPIO pins, as allocated to indicate the system memory channel.

At block 304, the system memory channel may be determined based at least in part on the first memory configuration GPIO pins. In example embodiments, the CPU 104 may have access to a look-up table, such as a table stored on the NVRAM 110, that indicates the correspondence between the state of the first memory configuration GPIO pins and the system memory channel for the system memory 106 and the computer system 100.

At block 306, a second memory configuration GPIO pins 134, 136, 138 may be read. It will be appreciated that reading the memory configuration GPIO pins 134, 136, 138 may indicate to the CPU 104 which of the GPIO pins are enabled and/or disabled. In some cases, providing a jumper 140 across the GPIO pins 130 enable GPIO pins 130, and in other cases, the lack of a jumper 140 may enable GPIO pins 130. In either case, the state (e.g., jumper provided or not provided) of the GPIO pins 134, 136, 138 may be indicative of a system memory size (e.g., 8 GB, 16 GB, etc.).

In some cases, one of the GPIO pins (e.g., GPIO pins 138) may be part of the second memory configuration GPIO pins, allocated to indicate the system memory size. In other cases, there may be two or more (e.g., GPIO pins 136 and GPIO pins 138) that are part of the second memory configuration GPIO pins, as allocated to indicate the system memory size. In example embodiments, the total number of system memory GPIO pins 134, 136, 138 may be allocated to either the first memory configuration GPIO pins for indicating the system memory channel or to the second GPIO pins for indicating the system memory size. For example, GPIO pins 134 may be allocated to the first GPIO pins for indicating the system memory channel, and GPIO pins 136 and 138 may be allocated to the second GPIO pins for indicating the system memory size.

At block 308, the system memory size may be determined based at least in part on the second memory configuration GPIOs. In example embodiments, the CPU 104 may have access to a look-up table, such as a table stored on the NVRAM 110, that indicates the correspondence between the state of the second memory configuration GPIO pins and the system memory size for the system memory 106 and the computer system 100.

At block 310, the SPD table corresponding of the system 100 may be determined based at least in part on the system memory channel and the system memory size. Thus, each unique system memory channel and system memory size combination may have its own SPD table, as stored on the NVRAM 110. The correspondence of the states of the memory configuration (e.g., system memory channel and system memory size) to the SPD tables 120, 122, 124 may be stored on a table, such as a correspondence table stored on the NVRAM 110. In some example embodiments, such a correspondence table may be stored as part of the firmware 112 on the NVRAM 110.

At block 312, the SPD table of the system may be retrieved. This may entail the CPU 104 accessing the appropriate SPD table 120, 122, 124, as determined by the processes of block 204, from the NVRAM 110.

At block 314, the SPD table may be loaded to the memory reference code structure. This may provide for the system 100 and the processor 104 thereon to define the system memory 106 of the system 100. In some cases, the SPD tables 120, 122, 124 may be 128 bytes in size, and the corresponding SPD table 120, 122, 124 may be retrieved from the NVRAM 110 by the processes of block 312, and concurrently loaded to the memory reference code structure. At block 316, the memory may be initialized according to the SPD table, as loaded to the memory reference code structure.

Figure 4:
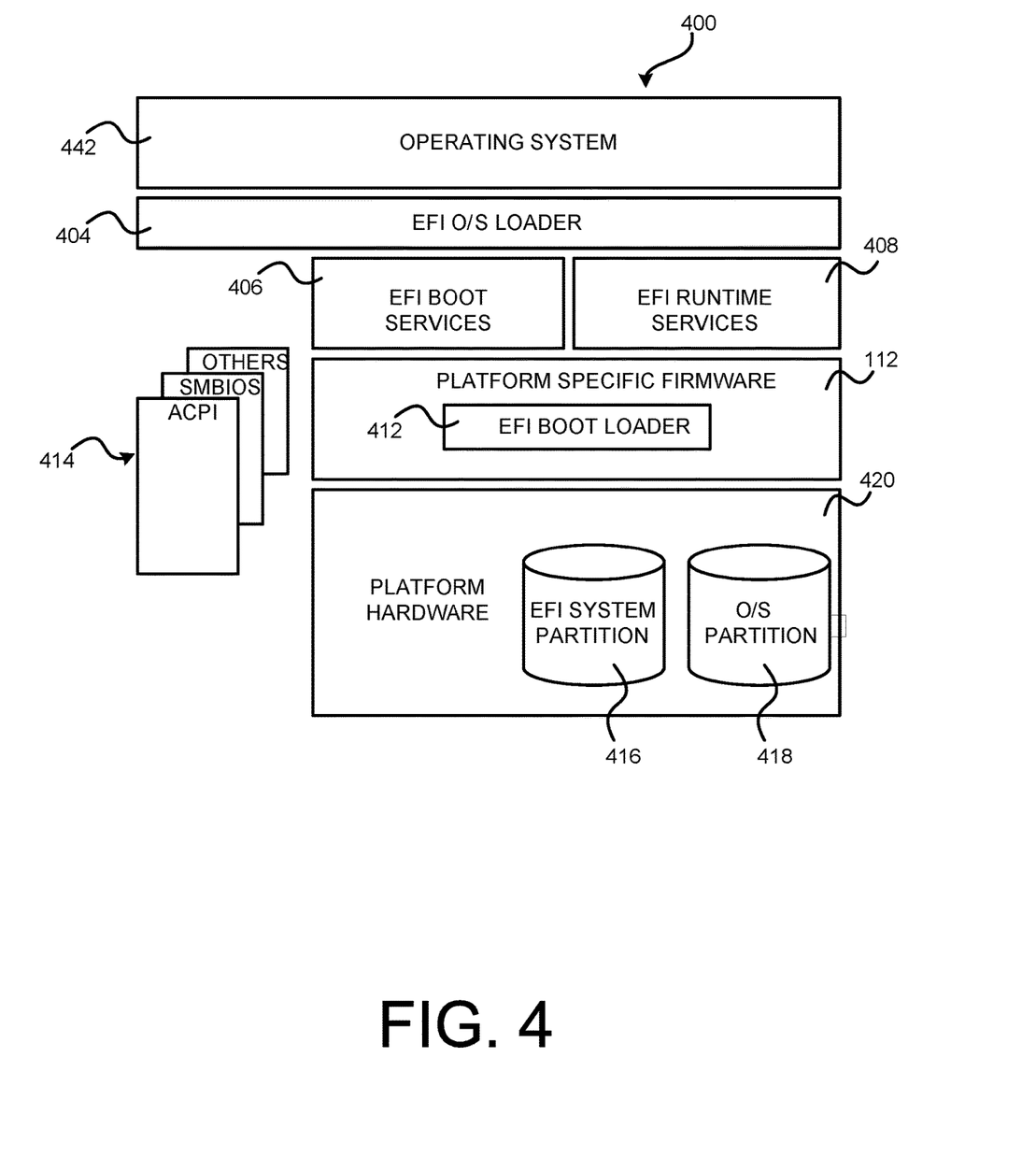
FIG. 4 is a software architecture diagram illustrating an example software architecture for a universal extensible firmware interface (UEFI)-compliant firmware that provides an operating environment for the technologies presented herein, according to example embodiments of the disclosure.

As shown in FIG. 4, the architecture can include platform hardware 420 and an operating system 442. The operating system (O/S) image can be retrieved from the UEFI system partition 416 using an UEFI operating system loader 404. The UEFI system partition 416 can be an architecturally shareable system partition. As such, the UEFI system partition 416 can define a partition and file system designed to support safe sharing of mass storage between multiple vendors. An O/S partition 418 can also be utilized.

Once started, the UEFI O/S loader 404 can continue to boot the complete operating system 402. In doing so, the UEFI O/S loader 404 can use UEFI boot services 406, an interface to other supported specifications to survey, comprehend, and initialize the various platform components and the operating system software that manages them. Thus, interfaces 414 from other specifications can also be present on the system. For example, the Advanced Configuration and Power Management Interface (ACPI) and the System Management BIOS (SMBIOS) specifications can be supported.

UEFI boot services 406 can provide interfaces for devices and system functionality used during boot time. UEFI runtime services 408 can also be available to the UEFI O/S loader 404 during the boot phase. For example, a set of runtime services can be presented to ensure appropriate abstraction of base platform hardware resources used by the operating system 402 during its operation. UEFI allows extension of platform firmware by loading UEFI driver and UEFI application images which, when loaded, have access to UEFI-defined runtime and boot services.

Additional details regarding the operation and architecture of a UEFI Specification compliant firmware can be found in the UEFI Specification which is available from INTEL CORPORATION. INTEL CORPORATION has also provided further details regarding recommended implementation of EFI and UEFI in the form of The INTEL Platform Innovation Framework for EFI ("the Framework"). Unlike the UEFI Specification, which focuses only on programmatic interfaces for the interactions between the operating system and system firmware, the Framework is a group of specifications that together describe a firmware implementation that has been designed to perform the full range of operations that are required to initialize the platform from power on through transfer of control to the operating system. Both the UEFI Specification and the specifications that make up the Framework, which are also available from INTEL CORPORATION, are expressly incorporated herein by reference.

Figure 5:
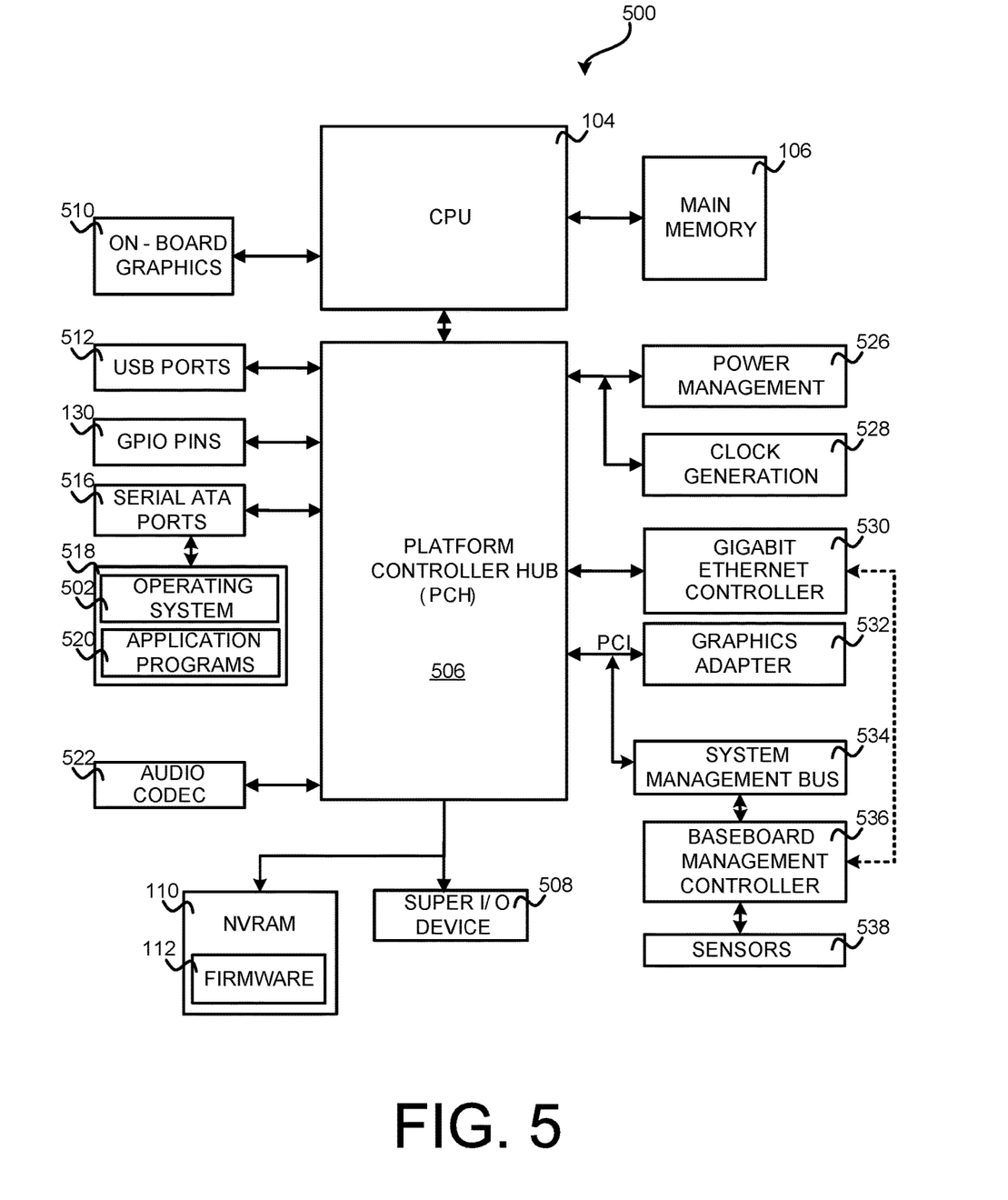
FIG. 5 is a computer architecture diagram that shows an illustrative architecture for a computer that can provide an operating environment for the technologies disclosed herein, according to example embodiments of the disclosure.

Referring now to FIG. 5, a computer architecture diagram that illustrates an illustrative architecture 100 for a computer that can provide an illustrative operative environment for the technologies presented herein will be described. FIG. 5 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including handheld devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 5 shows an illustrative computer architecture for a computer 500 that can be utilized in the implementations described herein. The illustrative computer architecture shown in FIG. 5 is for the computer 500 that includes a baseboard, or motherboard, which is a printed circuit board to which a multitude of components or devices can be connected by way of a system bus or other electrical communication path. In one illustrative configuration, a central processing unit (CPU) 104 operates in conjunction with a Platform Controller Hub (PCH) 506. The CPU 104 is a central processor that performs arithmetic and logical operations necessary for the operation of the computer 500. The computer 500 can include a multitude of CPUs 104. Each CPU 104 might include multiple processing cores.

The CPU 104 provides an interface to a random access memory (RAM) used as the main memory 106 in the computer 500 and, possibly, to an on-board graphics adapter 532. The PCH 506 provides an interface between the CPU 104 and the remainder of the computer 500.

The PCH 506 can also be responsible for controlling many of the input/output functions of the computer 500. In particular, the PCH 506 can provide one or more universal serial bus (USB) ports 512, an audio codec 522, a Gigabit Ethernet Controller 630, and one or more general purpose input/output (GPIO) pins 130. The USB ports 512 can include USB 2.0 ports, USB 3.0 ports and USB 3.1 ports among other USB ports. The audio codec 522 can include Intel High Definition Audio, Audio Codec '97 (AC'97) and Dolby TrueHD among others.

The PCH 506 can also include functionality for providing networking functionality through a Gigabit Ethernet Controller 530. The Gigabit Ethernet Controller 530 is capable of connecting the computer 500 to another computer via a network. Connections which can be made by the Gigabit Ethernet Controller 530 can include LAN or WAN connections. LAN and WAN networking environments are commonplace in offices, enterprise-wide computer networks, intranets, and the Internet.

The PCH 506 can also provide a bus for interfacing peripheral card devices such as a graphics adapter 532. In one configuration, the bus comprises a PCI bus. The PCI bus can include a Peripheral Component Interconnect (PCI) bus, a Peripheral Component Interconnect eXtended (PCI-X) bus and a Peripheral Component Interconnect Express (PCIe) bus among others.

The PCH 506 can also provide a system management bus 534 for use in managing the various components of the computer 500. Additional details regarding the operation of the system management bus 534 and its connected components are provided below. Power management circuitry 526 and clock generation circuitry 528 can also be utilized during the operation of the PCH 506.

The PCH 506 is also configured to provide one or more interfaces for connecting mass storage devices to the computer 500. For instance, according to a configuration, the PCH 506 includes a serial advanced technology attachment (SATA) adapter for providing one or more serial ATA ports 516. The serial ATA ports 516 can be connected to one or more mass storage devices storing an O/S, such as O/S 502 and application programs, such as a SATA disk drive 518. As known to those skilled in the art, an OS comprises a set of programs that control operations of a computer and allocation of resources. An application program is software that runs on top of the operating system software 502, or other runtime environment, and uses computer resources to perform application specific tasks desired by the user.

According to one configuration, the O/S 502 comprises the LINUX operating system. According to another configuration, the O/S 502 comprises the WINDOWS operating system from MICROSOFT CORPORATION. According to another configuration, the O/S 502 comprises the UNIX operating system. It should be appreciated that other operating systems can also be utilized.

The mass storage devices connected to the PCH 506, and their associated computer-readable storage media, provide non-volatile storage for the computer 500. Although the description of computer-readable storage media contained herein refers to a mass storage device, such as a hard disk or CD-ROM drive, it should be appreciated by those skilled in the art that computer-readable storage media can be any available media that can be accessed by the computer 500.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer 500.

A low pin count (LPC) interface can also be provided by the PCH 506 for connecting a Super I/O device 508. The Super I/O device 508 is responsible for providing a number of input/output ports, including a keyboard port, a mouse port, a serial interface, a parallel port, and other types of input/output ports. The LPC interface can also connect a computer storage media such as a ROM or a flash memory such as a NVRAM 110 for storing firmware 112 that includes program code containing the basic routines that help to start up the computer 500 and to transfer information between elements within the computer 500. The firmware 112 can be a multi-platform firmware.

It should be appreciated that the program modules disclosed herein, including the firmware 112, can include software instructions that, when loaded into the CPU 104 and executed, transform a general-purpose computer 500 into a special-purpose computer 500 customized to facilitate all, or part of, the operations disclosed herein. As detailed throughout this description, the program modules can provide various tools or techniques by which the computer 500 can participate within the overall systems or operating environments using the components, logic flows, and/or data structures discussed herein.

The CPU 104 can be constructed from any number of transistors or other circuit elements, which can individually or collectively assume any number of states. More specifically, the CPU 104 can operate as a state machine or finite-state machine. Such a machine can be transformed to a second machine, or a specific machine, by loading executable instructions contained within the program modules. These computer-executable instructions can transform the CPU 104 by specifying how the CPU 104 transitions between states, thereby transforming the transistors or other circuit elements constituting the CPU 104 from a first machine to a second machine, wherein the second machine can be specifically configured to perform the operations disclosed herein. The states of either machine can also be transformed by receiving input from one or more user input devices, network interfaces (such as the Gigabit Ethernet Controller 530), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include, but are not limited to: the technology used to implement the storage media, whether the storage media are characterized as primary or secondary storage, and the like. For example, if the storage media are implemented as semiconductor-based memory, the program modules can transform the physical state of the semiconductor main memory 106 and/or NVRAM 110. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described briefly above, the PCH 506 can include a system management bus 534. The system management bus 534 can include a Baseboard Management Controller (BMC) 536. In general, the BMC 536 is a microcontroller that monitors operation of the computer 500. In a more specific configuration, the BMC 536 monitors health-related aspects associated with the computer 500, such as, but not limited to, the temperature of one or more components of the computer 500, speed of rotational components (e.g., spindle motor, CPU fan, etc.) within the computer 500, the voltage across or applied to one or more components within the computer 500, and the available and/or used capacity of memory devices within the computer 500. To accomplish these monitoring functions, the BMC 536 is communicatively connected to one or more components by way of the system management bus 534.

In one configuration, these components include sensor devices 538 for measuring various operating and performance-related parameters within the computer 500. The sensor devices 538 can be either hardware or software based components configured or programmed to measure or detect one or more of the various operating and performance-related parameters.

The BMC 536 functions as the master on the system management bus 534 in most circumstances, but can also function as either a master or a slave in other circumstances. Each of the various components communicatively connected to the BMC 536 by way of the system management bus 534 is addressed using a slave address. The system management bus 534 is used by the BMC 536 to request and/or receive various operating and performance-related parameters from one or more components, which are also communicatively connected to the system management bus 534.

It should be appreciated that the functionality provided by the computer 500 can be provided by other types of computing devices, including hand-held computers, embedded computer systems, personal digital assistants, and other types of computing devices known to those skilled in the art. It is also contemplated that the computer 500 might not include all of the components shown in FIG. 5, can include other components that are not explicitly shown in FIG. 5, or might utilize an architecture completely different than that shown in FIG. 5.

Although the subject matter presented herein has been described in language specific to computer structural features, methodological acts, and computer readable media, it is to be understood that the present disclosure is not necessarily limited to the specific features, acts, or media described herein. Rather, the specific features, acts and mediums are disclosed as example forms.

Although the methods as described with reference to the flow diagram illustrated in FIGS. 2 and 3, many other operations for performing the acts associated with the methods may be used. For example, the order of the operations may be changed, some of the operations described may be optional, and additional operations may be included, in accordance with example embodiments of the disclosure.

The subject matter described above is provided by way of illustration only and should not be construed as limiting. Various modifications and changes can be made to the subject matter described herein without following the example configurations and applications illustrated and described, and without departing from the true spirit and scope of the present disclosure.

What is claimed is:

1. A computer implemented method, comprising: accessing, by one or more processors, one or more general purpose input/output (GPIO) pins, wherein the one or more GPIO pins comprise first GPIO pins, second GPIO pins, and third GPIO pins, wherein the first GPIO pins correspond to a channel type and the second GPIO pins and the third GPIO pins indicate a memory size; determining, by the one or more processors, a state of the one or more GPIO pins; determining, by the one or more processors, a serial presence detect (SPD) table using at least the state of the one or more GPIO pins, the SPD table determined by accessing a correspondence table indicating that the SPD table corresponds to the state of the one or more GPIO pins, wherein the correspondence table is stored in a non-volatile random access memory (NVRAM); loading, by the one or more processors, the SPD table to a memory reference code structure.

2. The method of claim 1, wherein the state of the one or more GPIO pins indicate a size of a system memory.

3. The method of claim 1, wherein the state of the one or more GPIO pins indicate a channel type of a system memory.

4. The method of claim 1, wherein the SPD table is a first SPD table and a plurality of SPD tables are stored on the nonvolatile random access memory (NVRAM), the plurality of SPD tables comprising the first SPD table.

5. The method of claim 1, wherein the one or more GPIO pins are set during manufacture of a computer.

6. An apparatus, comprising: at least one processor; one or more general purpose input/output (GPIO) pins; and one or more computer-readable storage media having instructions stored thereupon that are executable by the at least one processor and which, when executed by the at least one processor, cause the apparatus to: access the one or more GPIO pins, wherein the one or more GPIO pins comprise first GPIO pins, second GPIO pins, and third GPIO pins, wherein the first GPIO pins correspond to a channel type and the second GPIO pins and the third GPIO pins indicate a memory size; determine a state of the one or more GPIO pins; obtain, using at least the state of the one or more GPIO pins, a serial presence detect (SPD) table corresponding to the system memory identified by the state of the one or more GPIO pins, the SPD table obtained by accessing a correspondence table that indicates that the SPD table corresponds to the state of the one or more GPIO pins, wherein the correspondence table is stored in a non-volatile random access memory (NVRAM); and load the SPD table to a memory reference code structure.

7. The apparatus of claim 6, wherein the state of the one or more GPIO pins indicate a size of a system memory.

8. The apparatus of claim 6, wherein the state of the one or more GPIO pins indicate a channel type of a system memory.

9. The apparatus of claim 6, wherein the SPD table is a first SPD table and a plurality of SPD tables are stored on the nonvolatile random access memory (NVRAM), the plurality of SPD tables comprising the first SPD table.

10. The apparatus of claim 6, wherein the one or more GPIO pins are set during manufacture of the apparatus.

11. A non-transitory computer-readable storage medium having instructions stored thereupon which, when executed by a processor. cause the processor to perform operations comprising: accessing one or more general purpose input/output (GPIO) pins, wherein the one or more GPIO pins comprise first GPIO pins, second GPIO pins, and third GPIO pins, wherein the first GPIO pins correspond to a channel type and the second GPIO pins and the third GPIO pins indicate a memory size;
determining a state of the one or more GPIO pins; accessing, based at least in part on the state of the one or more GPIO pins, a serial presence detect (SPD) table corresponding to a system memory identified by the state of the one or more GPIO pins, the accessing comprising accessing a correspondence table that indicates that the SPD table corresponds to the state of the one or more GPIO pins, wherein the correspondence table is stored in a non-volatile random access memory (NVRAM); and loading the SPD table to a memory reference code structure.

12. The non-transitory computer-readable storage medium of claim 11, wherein the state of the one or more GPIO pins indicate a size of a system memory.

13. The non-transitory computer-readable storage medium of claim 11, wherein the state of the one or more GPIO pins indicate a channel type of a system memory.

14. The non-transitory computer-readable storage medium of claim 11, wherein the SPD table is a first SPD table and a plurality of SPD tables are stored on the nonvolatile random access memory (NVRAM), the plurality of SPD tables comprising the first SPD table.

* * * * *

UNITED STATES PATENT AND TRADEMARK OFFICE
CERTIFICATE OF CORRECTION

PATENT NO. : 10,628,309 B1  
APPLICATION NO. : 15/725981  
DATED : April 21, 2020  
INVENTOR(S) : Michael Harry Deiderich

It is certified that error appears in the above-identified patent and that said Letters Patent is hereby corrected as shown below:

In the Claims

Column 14 (Claim 11) Line 46 delete:
"11. A non-transitory computer-readable storage medium having instructions stored thereupon which, when executed by a processor. cause the processor to perform operations comprising:"

And insert:
--11. A non-transitory computer-readable storage medium having instructions stored thereupon which, when executed by a processor, cause the processor to perform operations comprising:--

Signed and Sealed this  
Twenty-third Day of June, 2020

Andrei Iancu  
*Director of the United States Patent and Trademark Office*